United States Patent [19]

Lucas

[11] Patent Number: 4,900,069
[45] Date of Patent: Feb. 13, 1990

[54] SELF-ADJUSTING BRANCH PIPING SEAL

[76] Inventor: R. Clark Lucas, P.O. Box 4124, Santa Barbara, Calif. 93103

[21] Appl. No.: 309,326

[22] Filed: Feb. 10, 1989

[51] Int. Cl.$^4$ ............................................. F16L 41/00
[52] U.S. Cl. .................................. 285/197; 285/351; 285/423
[58] Field of Search ............... 285/197, 198, 199, 351, 285/423

[56] References Cited

U.S. PATENT DOCUMENTS 3,364,939  1/1968  Valenziano ..................... 285/197 X
3,622,184  11/1971 Deasy ................................ 285/197
3,880,452  4/1975  Fields .............................. 285/351 X
4,441,744  4/1984  Oostenbrink .................... 285/197 X

FOREIGN PATENT DOCUMENTS

1038501  9/1958  Fed. Rep. of Germany ...... 285/351
1213179  3/1966  Fed. Rep. of Germany ...... 285/197

Primary Examiner—Dave W. Arola
Attorney, Agent, or Firm—Christie, Parker & Hale

[57] ABSTRACT

The present invention provides a branch type seal which is self adjusting for use on existing pipelines of various diameters and materials. The invention includes an adapter with a longitudinal bore which is axially aligned with the hole in the main pipeline. A plurality of deformable retaining fingers extending outward from the adapter engage a compression seal. The retaining fingers are deformed to contour to the pipeline surrounding the hole by a hubbed retainer which places pressure on the retaining fingers deforming the fingers and compression seal against the wall of the pipeline creating a leak proof seal.

8 Claims, 6 Drawing Sheets

SELF-ADJUSTING BRANCH PIPING SEAL

BACKGROUND OF THE INVENTION

1 Field of the Invention

The present invention relates generally to devices for sealing a branch pipe retrofitted to an existing pipeline. More particularly, the invention relates to a branch pipe seal which is self-adjusting for use on existing pipelines of various diameters and materials.

2. Prior Art

In original construction of piping systems, a branch pipe connection is accomplished using a Tee. When a branch pipe is added to an existing pipeline, a portion has to be completely disassembled to install a new tee or a "saddle clamp" device is typically used to complete the connection. To install the saddle clamp device, a hole is drilled in the existing pipeline and the saddle clamp, with an adapter for attaching to the branch pipe, is installed over the hole. Appropriate gasketing or other sealing material is used to provide a leak-tight seal around the hole. Typically, the saddle clamp exerts pressure on the gasket material to effectuate the seal.

Due to the configuration of the existing pipe, the tangent to sealing surface has a constantly changing angle with respect to the axis of the hole. This angle is dependent upon the diameter of the hole and the diameter of the pipeline. To accommodate the varying diameters of pipe and holes for branch pipes, numerous sizes of "saddles" were required. In addition, the diameter of the hole relative to the diameter of the pipeline often required specially designed gaskets or other sealing means to accomplish a leak-tight seal.

One prior-art approach involves sizing of the saddle and seals to accommodate specific pipe diameters. U.S. Pat. No. 4,613,171 to Corcoran provides a recent example of this type of device. The Corcoran invention requires a special gasket adapted for each hole diameter and a saddle and clamping device limited to a small range of pipe diameters.

A second example of the prior art is provided in U.S. Pat. No. 4,627,648 to Montpetit. The Montpetit device is usable on a small range of diameters of pipe. However, each individual device is limited to a single hole size.

A final example demonstrates a device constrained both by hole size and pipeline diameter. U.S. Pat. No. 4,103,940 to Bills provides a branch fitting having an underface generally conforming to the outer surface of the pipe and a tubular portion extending into the hole to provide self-alignment and self-jigging for brazing or soldering the device to the pipe.

SUMMARY OF THE INVENTION

The present invention is a self-adjusting branch piping seal which accommodates a range of pipe diameter and hole diameter with a single sealing device. The invention includes an adaptor with a longitudinal bore which is axially aligned with the hole in the main pipeline. A plurality of retaining fingers extend radially outward from the adaptor. Each of the retaining fingers is deformable in a plane including the axis of the adaptor bore. A seal ring, axially aligned with the adaptor bore and the hole, is engaged between the retaining fingers and the wall of the pipeline. A retainer having a hub with an aperture to receive the adaptor exerts pressure on the fingers deforming the fingers to conform to the contour of the pipeline surrounding the hole. The deformed fingers compress the seal ring against the wall of the pipeline creating a leak-proof seal. The retainer is held in place on the pipeline using band clamps or similar means.

DETAILED DESCRIPTION OF THE INVENTION

Figure 1:
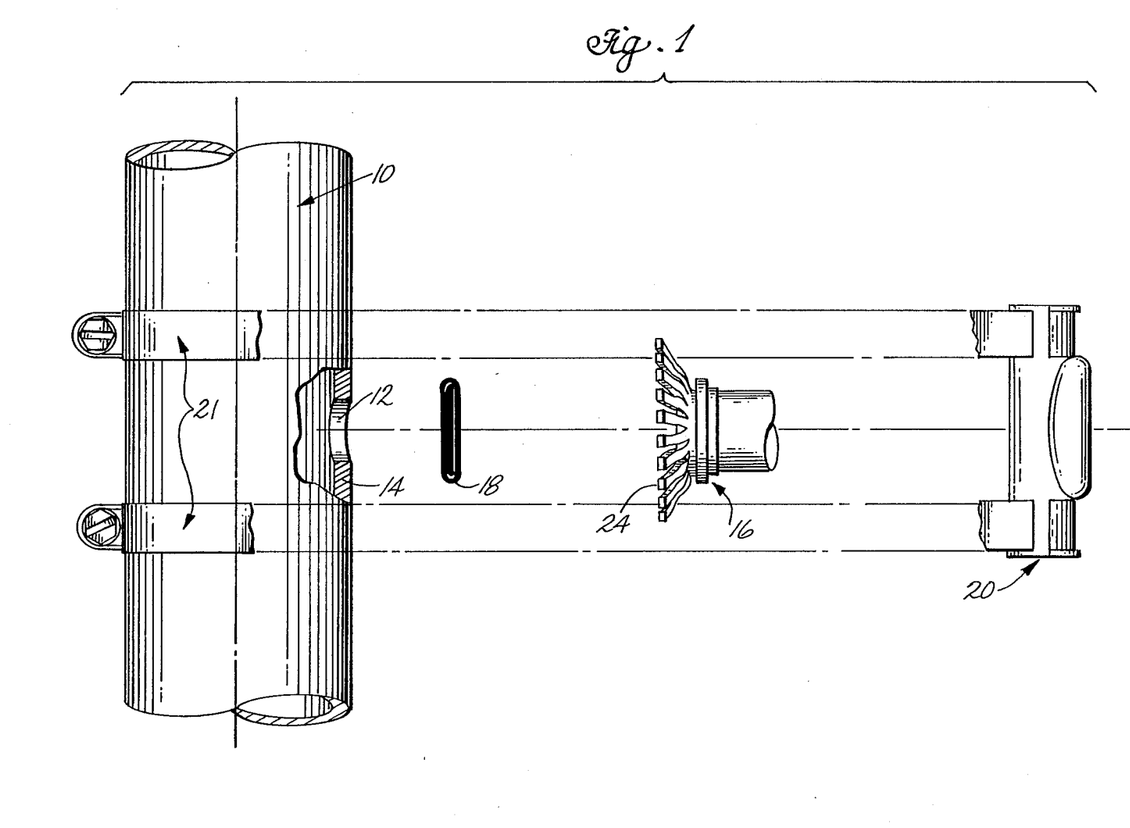
FIG. 1 is an exploded pictorial view of the main features of the invention.

The invention is employed for sealing a hole in the wall of a main pipeline to form a branch pipe as shown in FIG. 1. A main pipeline 10 has hole 12 drilled in the wall 14 for branching flow of the liquid or gas in the pipe. The invention comprises an adaptor 16 which compresses a seal ring 18 to the wall of the pipe surrounding the hole and a retainer 20 which provides a means for constraining the adaptor in alignment with the hole and exerting pressure on the adaptor to compress and seal the seal ring. Band clamps 21 are used to maintain the retainer in place on the pipe and provide compression force for the retainer adaptor and compression seal ring.

Figure 2:
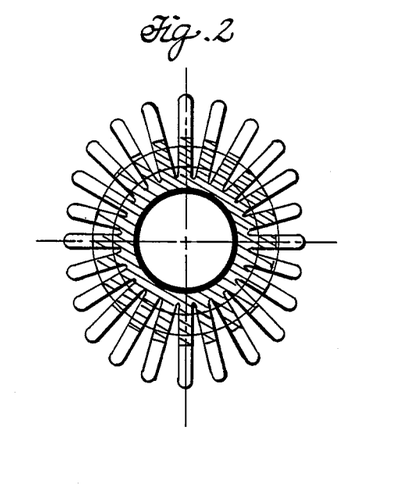
FIG. 2 is a bottom view of the adaptor.
Figure 3:
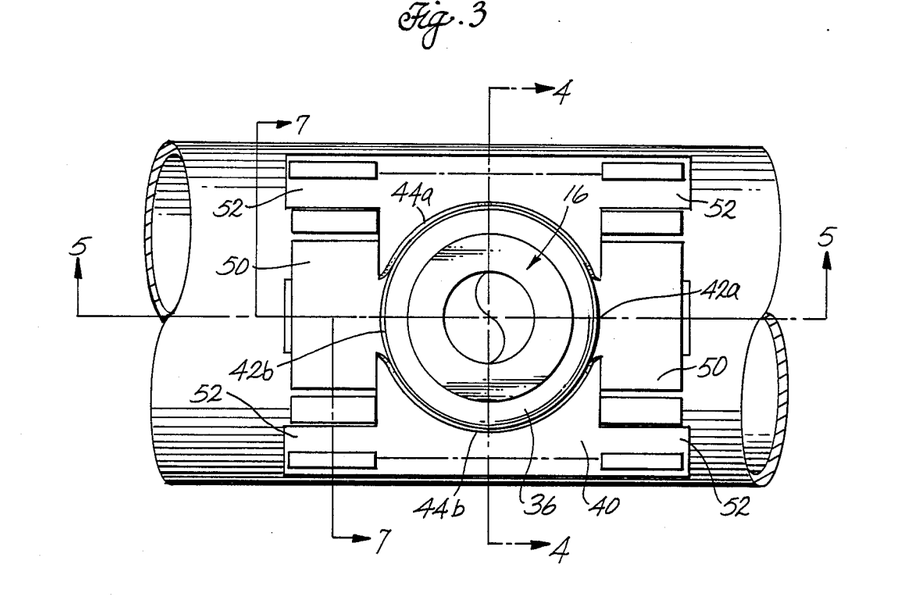
FIG. 3 is a top view of the invention showing the retainer in place over the adaptor.

As shown in FIG. 2, the adaptor has a longitudinal bore 22, which is axially aligned with the hole in the main pipeline. A plurality of retaining fingers 24 extend radially outward from the adaptor. The individual fingers are spaced circumferentially at the outer extremity and are deformable in a plane including the axis of the bore. As shown in FIG. 3, the retainer constrains the adaptor and deforms the fingers, as will be explained in greater detail subsequently, to conform to the shape of the wall of the pipe, thereby compressing the seal ring between the fingers, the adaptor and the wall of the pipeline.

Figure 4:
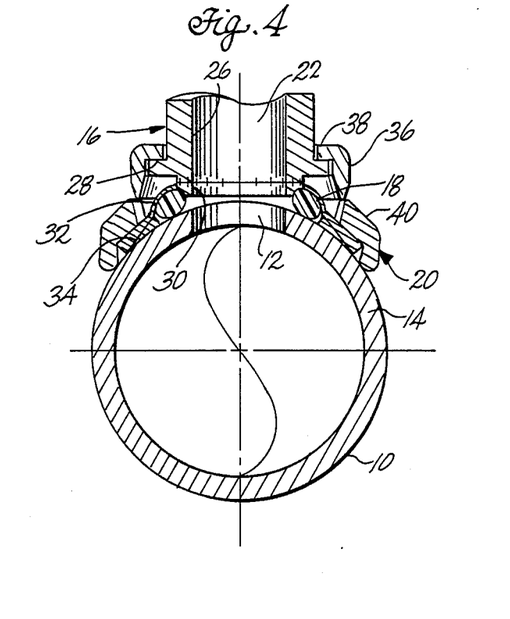
FIG. 4 is a sectional view of the invention along line 4—4 of FIG. 2.

As shown in the embodiment in FIG. 4, the adaptor has a cylindrical body portion 26 with a land 28 extending radially. Depending from the body portion below the land is a waist portion 30, which engages the inner diameter of the seal ring. The retaining fingers extend radially from the waist portion of the adaptor. An arcuate portion 32 of the fingers engages the seal ring. A foot portion 34 of the sealing finger extends radially outward from the arcuate portion and is engaged by the retainer.

The retainer has a hub 36 with an aperture to receive the body portion of the adaptor. A shoulder 38 forms the perimeter of the aperture and engages the land on the adaptor. A flexible saddle 40 is attached to the hub. The saddle engages the foot portion on each of the retaining fingers. The retainer is urged radially inward on the main pipeline, which in turn forces the adaptor radially inward through contact of the shoulder of the hub with the land of the adaptor. This forces the waist portion of the adaptor into sealing engagement with the compression seal ring. Also, the saddle of the retainer urges the foot portions of the fingers radially inward to conform to the shape of the wall of the main pipeline surrounding the hole. The arcuate portions of the retaining fingers are thereby deformed, compressing the seal ring forming a seal against the outer diameter of the wall.

Figure 5:
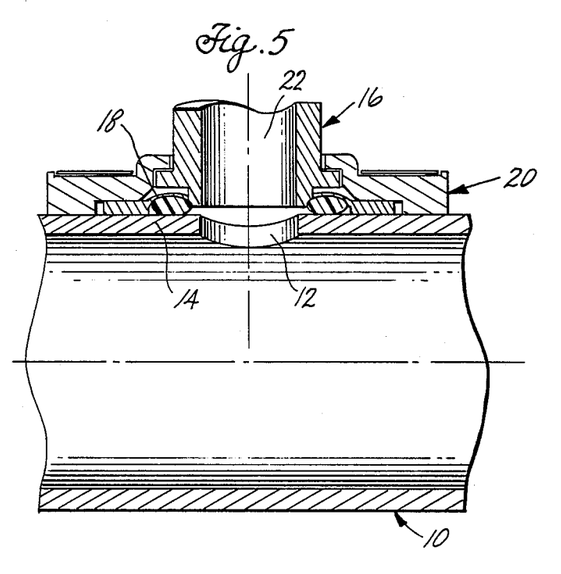
FIG. 5 is a sectional view of the invention taken along line 5—5 of FIG. 3.
Figure 6A:
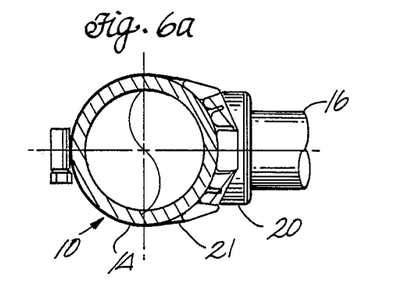
FIGS. 6A, 6B and 6C show the invention installed on various diameter pipelines.
Figure 6B:
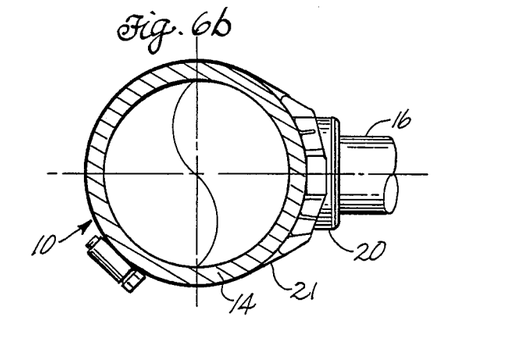
Figure 6C:
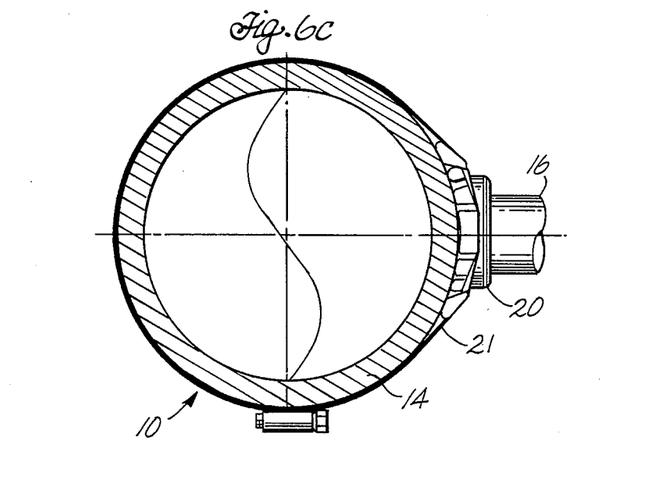

As shown in FIGS. 4 and 5, the individual fingers are deformed by the retainer corresponding to their circumferential location about the hole, thereby compressing the seal ring and maintaining a leak-proof seal, irrespective of the immediate tangential angle of the surface. The shape of the arcuate portion of the fingers constrains the seal ring such that, regardless of deformation in the seal ring due to the exerted force, a seal is maintained between the seal ring and the waist portion of the adaptor and the outer diameter of the wall on the main pipeline. A single size seal ring and adaptor may be used for any diameter hole less than the nominal diameter of the seal ring. As shown in FIGS. 6A, 6B and 6C, the flexible saddle and deformable fingers on the adaptor accommodate a range of diameters for the main pipeline.

Figure 7:
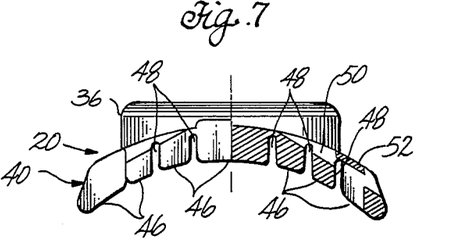
FIG. 7 is a partial sectional view of the retainer taken along line 7—7 of FIG. 3.

As shown in FIG. 3, the saddle portion of the retainer attaches to the hub at bridge portions 42A and 42B. Relief slots 44A and 44B allow lateral flexibility of the saddle. As shown in FIG. 7, the saddle has ribs 46 which are oriented along the longitudinal direction of the main pipeline. These ribs provide rigidity of the saddle in the longitudinal direction and contact the foot portions of the retaining fingers on the adaptor. Relief slots 48 separate the ribs to enhance flexibility in the lateral direction allowing the saddle to conform to the external wall of various diameter pipelines.

In the preferred embodiment, the retainer is molded from ABS, PVC, Delrin or other plastic material. Similarly, the adaptor may be molded from the same or a similar plastic material such that the arcuate portion of the retaining fingers is deformable from a nominal as-molded position to enhance adaptability to the contour of the wall of the pipeline when under compression from the saddle. Those skilled in the art will recognize malleable metals which may be employed as a substitute for the defined plastics.

As shown in FIG. 3, the saddle may be molded with appropriate reliefs 50 and guides 52 to constrain the band clamps on the saddle.

Figure 8A:
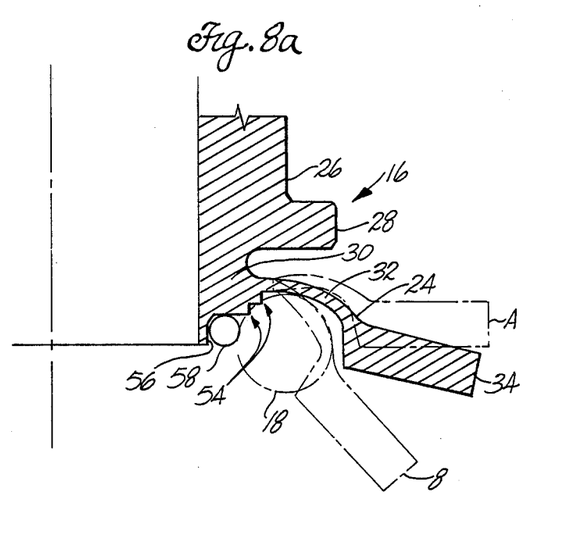
FIGS. 8A, 8B and 8C show cross section views of a second embodiment of the invention.
Figure 8B:
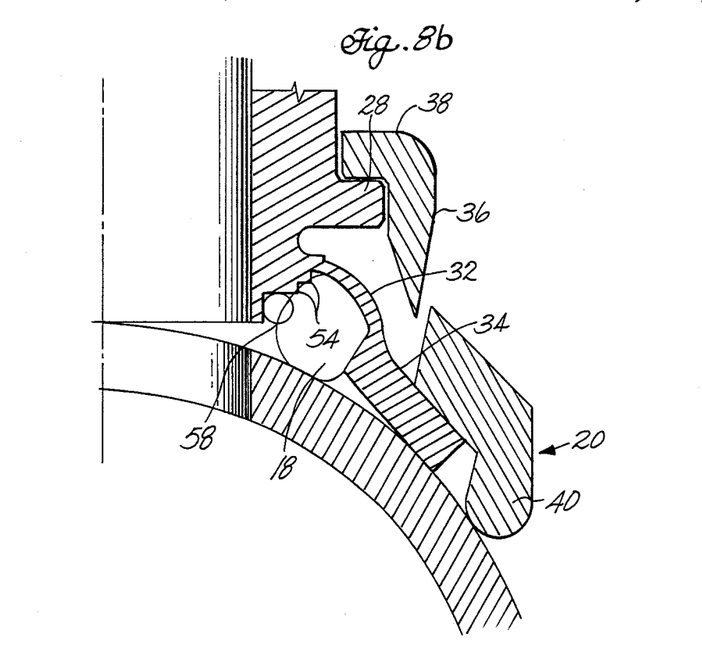
Figure 8C:
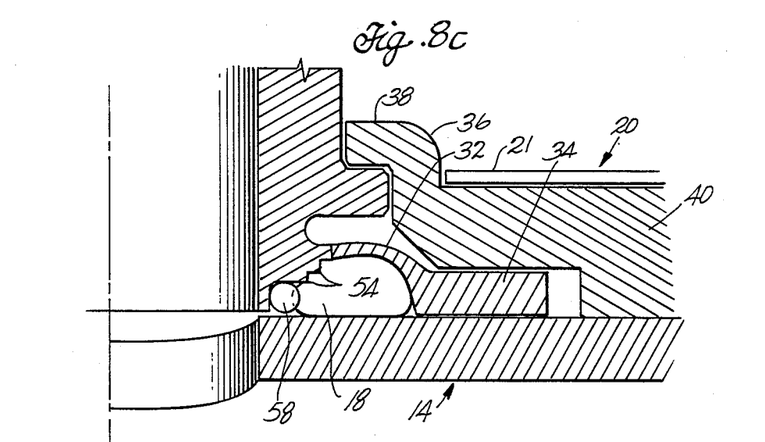

A second embodiment of the invention is shown in FIGS. 8A, 8B, and 8C. As seen in FIG. 8A, this embodiment of the invention includes circumferential sealing ridges 54 on the waist portion of the adapter which engage the compression seal ring on the inside upper quadrant. In addition, a step 56 is formed in the outer diameter of the lower extremity of the waist portion. A pressure seal ring 58 is seated on the step. The outer diameter of the pressure seal ring contacts the inner diameter of the compression seal ring with an interference fit.

When the adaptor and retaining fingers are placed under compression by the hub and saddle of the retainer, the arcuate portion of the retaining fingers flexes to conform to the tangency angle of the wall of the pipeline. At a location parallel to the longitudinal axis of the pipeline, the sealing finger will attain a position as shown in phantom A, while a finger in the plane of the lateral cross-section of the pipeline will assume a position as shown by phantom B. Position is dependent on pipe diameter; larger diameter produces less downward deflection.

Referring now to FIG. 8B, the invention is shown in the lateral cross-section of the pipeline. With the band clamps installed, the saddle and hub of the retainer place the adaptor and retaining fingers in compression. The saddle engages the foot portion of each sealing finger, deforming the arcuate portion of the finger to compress and restrain the compression seal ring. The shoulder of the hub exerts force on the land of the adaptor, urging the adaptor radially inward with respect to the pipeline. The circumferential sealing ridges engage the compression seal ring, providing a leak-tight seal between the adaptor and the compression seal ring.

The compression seal ring is forced against the outer diameter of the wall of the pipeline by the arcuate portion of the retaining fingers. The high-pressure seal ring contacts the diametrical and perpendicular faces of the step and the inner diameter of the compression seal ring. High pressure from the pipeline is exerted on the compression seal ring, forcing it outward and tending to separate the compression seal ring from its seal with the circumferential sealing ridges. However, the pressure is also exerted against the high-pressure seal ring, forcing it outward and compressing the high-pressure seal ring against the perpendicular face of the step and the compression seal ring. This tends to maintain continued contact between the high-pressure seal ring and the compression seal ring, thereby maintaining the pressure seal. Both seal rings respond to the pressure changes causing them to move together to maintain the seal.

The relative diameters of the material in the compression seal ring and pressure seal ring are selected such that the maximum deformed shape of the compression seal ring does not create contact between the pressure seal ring and the outer wall surface of the pipeline. Deformation of the pressure seal ring is created by fluid pressure as opposed to mechanical force between structural elements of the invention.

It should be noted that the dual seal ring seal described herein may be employed to seal an aperture in any surface. An adapter substantially as described with sealing ridges contacting the compression seal ring as a primary seal with an adjacent seat for the pressure seal ring constraining the pressure seal ring for deformation under fluid pressure maintains contact between the pressure seal ring and compression seal ring enhancing the overall seal. The adapter may be configured to provide appropriate constraint for the compression seal ring and interfacing with forcing means to urge the adapter toward the surface to be sealed, thereby compressing the compression seal ring.

FIG. 8C shows the invention in cross-section parallel to the longitudinal axis of the pipeline. As shown for the lateral cross-section, the compression seal ring is compressed and constrained by the arcuate portion of the sealing finger. As shown, the compression seal ring provides a seal between the outer diameter of the wall of the pipeline and the sealing circumferential ridges on the waist portion of the adaptor, regardless of the contour created by the differing tangency angles of the wall around the hole.

In various embodiments of the present invention, the body portion of the adaptor may be altered to any suitable configuration for attachment to the branch line. As examples, internal or external threads may be applied to the body for threadable connection with a mating fitting or a barb adaptor employed for installation of flexible tubing. Alternate materials of construction for the adaptor and retainer may be used as required.

Having now described the invention in detail as required by the Patent Statutes, those skilled in the art will have little difficulty in making alterations and modifications as described or as necessary for special application. Such modifications fall within the scope and intent of the invention as evidenced in the following claims.

What is claimed is:

1. A self-adjusting branch piping seal device for connecting a branch pipe to a main pipeline having a hole in the wall, the sealing device comprising:
   an adaptor having a longitudinal bore for axial alignment with the hole in the main pipeline and further having a circumferential sealing surface;
   a plurality of retaining fingers flexibly attached to and extending radially outward in circumferentially spaced relation from the adaptor adjacent the sealing surface, the retaining fingers each being deformable in a plane including the axis of the adapter bore;
   a compression seal ring axially aligned with the adaptor and engaged between the retaining fingers and the wall of the pipeline the inner diameter of the compression seal ring sized to contact the sealing surface of the adapter when under compression; and
   means for constraining the adaptor in alignment with the hole and exerting force on the fingers radially inwardly with respect to the main pipeline thereby deforming the fingers to compress the seal ring between the fingers and the wall of the pipeline compressing the seal ring in contact with the adaptor sealing surface effectuating a seal between the adaptor and the pipeline wall.

2. A sealing device as defined in claim 1 wherein the adaptor comprises:
   a cylindrical body portion;
   a land radially extending from the cylindrical portion for engaging the constraining means; and
   said sealing surface of the adapter including a waist portion depending longitudinally from the body portion to engage the inner diameter of the compression seal ring.

3. A sealing device as defined in claim 2 wherein the retaining fingers extend radially from the waist portion of the adaptor, and the retaining fingers comprise a leg portion for deformably engaging the compression seal ring, and a foot portion extending radially outward from the leg portion engaging the constraining means to be urged against the wall of the pipeline.

4. A sealing device as defined in claim 3 wherein the waist portion has at least one circumferential sealing ridge adjacent the leg portion for engaging the compression seal ring, the waist portion further having a reduced outer diameter step distal the body portion, the sealing device further comprising a second seal ring seated on the step and contacting the inner diameter of the compression seal ring, whereby pressure tending to further compress the compression seal ring causing separation from the sealing ridge compresses the second seal ring to an oblate shape maintaining contact between the seal rings.

5. A sealing device as defined in claim 3 wherein the constraining means comprises:
   a hub having an aperture to receive the body portion of the adaptor and a shoulder surrounding the aperture to engage the land;
   a flexible saddle attached to the hub and engaging the foot portion of the fingers; and
   means for urging the hub and saddle radially inward on the pipeline.

6. A sealing device as defined in claim 5 wherein the urging means comprising two band clamps encircling the main pipeline and saddle on opposite sides of the hub.

7. A sealing device as defined in claim 6 wherein the pipeline has a longitudinal axis and the saddle has ribs oriented parallel to the longitudinal axis of the pipeline for engaging the foot portions of the retaining fingers and wherein the saddle further has relief slots extending parallel to the longitudinal axis of the pipeline intermediate the ribs, the ribs maintaining rigidity in the longitudinal direction while the slots allow compliance of the saddle orthogonal to the longitudinal axis of the pipeline thereby allowing the band clamps to forcefully conform the saddle to the pipeline, urging the ribs against the foot portions of the retaining fingers and deforming the leg portion to constrain and compress the compression seal ring creating a leak-tight seal.

8. A self-adjusting branch piping seal device for connecting a branch pipe to a main pipeline having a hole in the wall, the sealing device comprising:
   a substantially cylindrical adaptor having a longitudinal bore for axial alignment with the hole in the main pipeline, the adaptor having a circumferential step in the outer diameter proximate the hole in the wall, and at least one circumferential sealing ridge on the outer diameter of the adaptor adjacent the step distal from the hole;
   a first compression seal ring engaging the sealing ridge on an upper inner surface of the compression seal ring and the wall of the pipeline on a lower surface of the seal ring;
   a second pressure seal ring seated in the step and engaging an inner surface of the compression seal ring; and
   means for captively compressing the first compression seal ring against the contact with said second pressive seal ring of the pipeline and in wall.

* * * * *

UNITED STATES PATENT AND TRADEMARK OFFICE
CERTIFICATE OF CORRECTION

PATENT NO. : 4,900,069

DATED : February 13, 1990

INVENTOR(S) : R. Clark Lucas

It is certified that error appears in the above-identified patent and that said Letters Patent is hereby corrected as shown below:

Column 1, line 5, after "1" insert a period.

Column 6, lines 54-56, delete lines 54-56 and insert therefor
-- means for captively compressing the first compression seal ring against the wall of the pipeling and in contact with said second pressure seal ring.--.

Signed and Sealed this

Twenty-first Day of April, 1992

Attest:

HARRY F. MANBECK, JR.

*Attesting Officer*         *Commissioner of Patents and Trademarks*